(12) United States Patent
Lim et al.

(10) Patent No.: US 7,539,128 B2
(45) Date of Patent: May 26, 2009

(54) METHOD FOR PROTECTING AND RESTORING LINK USING OPTICAL LABEL MERGING AND DYNAMIC RESOURCE SHARING WITH NETWORK LOAD

(75) Inventors: Hyun Su Lim, Yuseong-gu (KR); In Yong Hwang, Dangjin-gun (KR); Hong Shik Park, Yuseong-gu (KR)

(73) Assignees: Samsung Electronics Co., Ltd., Suwon-Si (KR); Information and Communications University Research and Industrial Cooperation Group, Daejeon (KR)

( * ) Notice: Subject to any disclaimer, the term of this patent is extended or adjusted under 35 U.S.C. 154(b) by 458 days.

(21) Appl. No.: 11/061,637

(22) Filed: Feb. 22, 2005

(65) Prior Publication Data

US 2006/0056286 A1 Mar. 16, 2006

(30) Foreign Application Priority Data

Sep. 10, 2004 (KR) ...................... 10-2004-0072574

(51) Int. Cl.
  *G08C 15/00* (2006.01)
  *H04J 1/16* (2006.01)
  *H04L 12/26* (2006.01)
(52) U.S. Cl. .................................................... 370/216
(58) Field of Classification Search ......... 370/216–228; 714/746, 748, 749
See application file for complete search history.

(56) References Cited

U.S. PATENT DOCUMENTS 5,646,936 A * 7/1997 Shah et al. .................. 370/228
6,324,162 B1 * 11/2001 Chaudhuri ................... 370/225
2003/0112749 A1 * 6/2003 Hassink et al. .............. 370/225
2005/0286411 A1 * 12/2005 Alicherry et al. ............ 370/216

OTHER PUBLICATIONS

Jin Ho Hahm et al., Restoration Mechanisms and Signaling in Optical Networks, Feb. 2001, Internet Draft, 36 pages.*
English Abstract of Korean Patent Publication No. 10-1999-0056124.
English Abstract of Korean Patent Publication No. 10-1999-0070192.
English Abstract of Korean Patent Publication No. 10-2000-0037968.

* cited by examiner

*Primary Examiner*—Chirag G Shah
*Assistant Examiner*—Srinivasa R Reddivalam
(74) *Attorney, Agent, or Firm*—Staas & Halsey LLP

(57) ABSTRACT

Disclosed herein is a method for protecting and restoring a link in an OBS network. The method includes a step of transmitting/receiving a liveness-confirming message for confirming liveness of the link between an up-node and a down-node respectively connected to both ends of the link at a predetermined message transmission period, to judge whether a fault is generated on the link, a step in which the up-node and down-node respectively update link information when it is judged that the link fault is not generated, and a step of restoring the link having the fault using predetermined restoration channel information based on an offered load measured when the link is in a normal state when it is judged that the link fault is generated. Accordingly, a link having a problem can be effectively protected and restored in the OBS network.

12 Claims, 12 Drawing Sheets

FIG. 5A

Liveness message                                          510

| Destination node ID | Source node ID | Type | TTL | Transmission time of liveness message |
|---|---|---|---|---|
| 511 | 512 | 513 | 514 | 515 |

FIG. 5B

Request message                                           520

| Destination node ID | Source node ID | Type | TTL | Protection channel information |
|---|---|---|---|---|
| 521 | 522 | 523 | 524 | 525 |

FIG. 5C

Response message 530

| Destination node ID | Source node ID | Type | TTL | ACK/NAK to response request message |
|---|---|---|---|---|
| 531 | 532 | 533 | 534 | 535 |

FIG. 5D

Urge message for request 540

| Destination node ID | Source node ID | Type | TTL | Urge retransmission of request message |
|---|---|---|---|---|
| 541 | 542 | 543 | 544 | 545 |

FIG. 5E

Urge message for response

| Destination node ID | Source node ID | Type | TTL | Urge retransmission of request message |
|---|---|---|---|---|
| 551 | 552 | 553 | 554 | 555 |

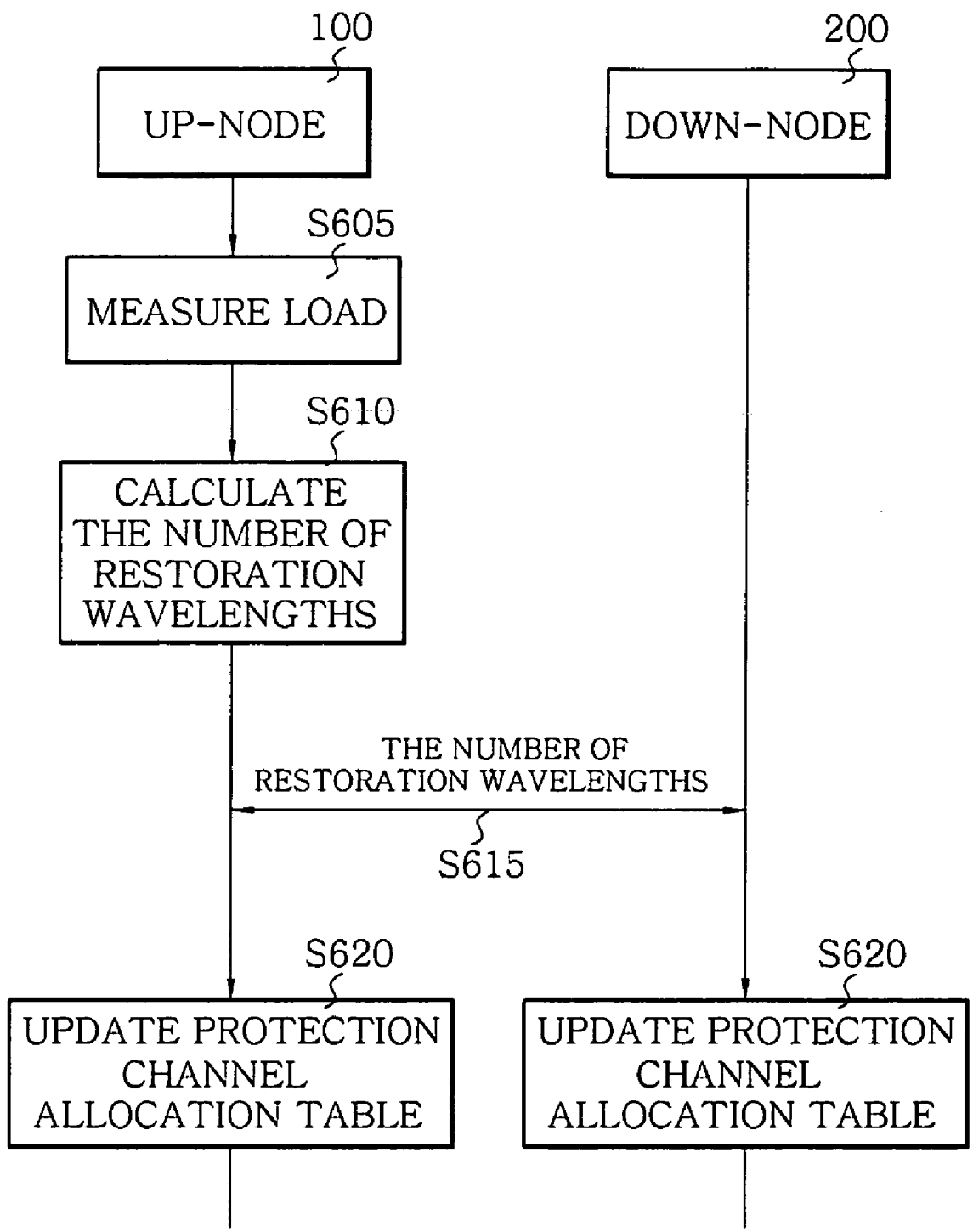

FIG. 6B

Protection Channel Allocation Table

| LOAD | RESTORATION WAVELENGTHS |
|---|---|
| ... | ... |
| 0.4 | $\lambda\_p1$ , $\lambda\_p2$ |
| 0.6 | $\lambda\_p1$ , $\lambda\_p2$ , $\lambda\_p3$ |
| ... | ... |

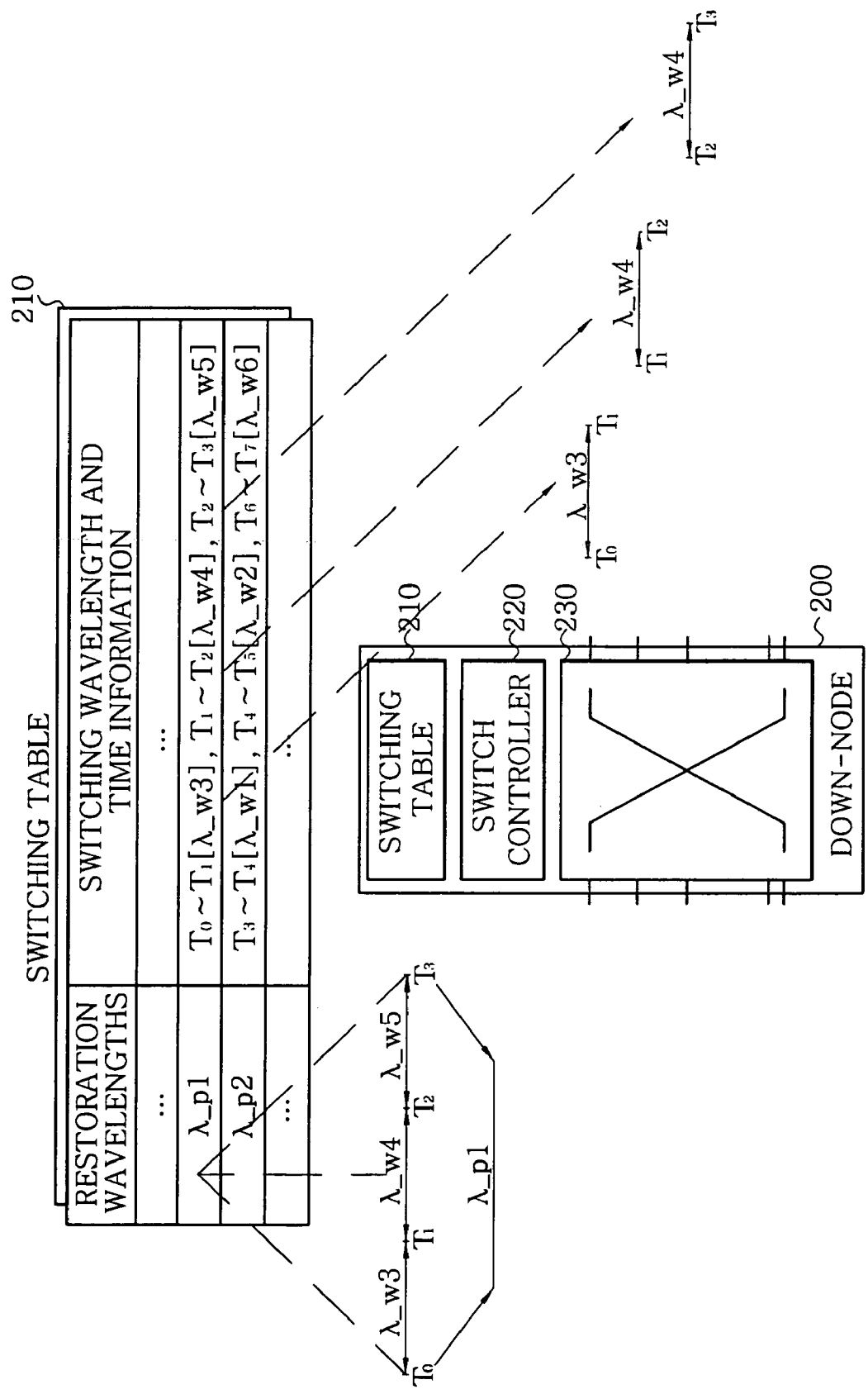

METHOD FOR PROTECTING AND RESTORING LINK USING OPTICAL LABEL MERGING AND DYNAMIC RESOURCE SHARING WITH NETWORK LOAD

BACKGROUND OF THE INVENTION

1. Field of the Invention

The present invention relates to a method for protecting and restoring a link and, more particularly, to a method for protecting and restoring a link using optical label merging and dynamic resource sharing in response to a network load in an optical burst switching (OBS) network.

2. Background of the Related Art

A rapid increase in Internet traffic and demands for Quality of Services (QoS) and discriminative application services have brought about rapid evolution of optical networks. The current core technique of optical networks is a line switching technique based on dense wavelength division multiplexing (DWDM) that multiplexes and transmits a maximum of 80 wavelengths on a single optical fiber. However, this technique is not efficient because it cannot maximize optical transmission characteristic.

Furthermore, ultra-high speed optical packet switching (OPS) is the most appropriate technique for accommodating Internet traffic. However, this technique has many technical limitations in that there exist no buffer for optical purposes and the current switching time of optical device is longer than a packet transmission time.

To address these problems, there has been proposed optical burst switching (OBS), which is recognized as the most realizable optical switching technique. To implement this OBS technique, studies on a control plane and a burst generation algorithm have been actively carried out. However, there is little or no research in protection and restoration fields.

The liveness probability of the network in communication means capability of solving a fault generated in a network and restoring the function of the network. This is one of essential functions of optical networks for stabilized communication. In consideration of large-capacity high-speed transmission environment enabled by DWDM, the capability of restoring the network function is a very important function because a single link fault may cause a vast amount of data loss in the large-capacity high-speed transmission environment.

In order to increase the liveness probability of the network, a passive protecting and restoring method, easily applied to line switching optical networks, was used. Examples of such conventional protecting and restoring mechanisms include a 1:1 route-based protection and restoration mechanism, a 1:1 link-based protection and restoration mechanism, a 1+1 route-based protection and restoration mechanism, and a 1+1 link-based protection and restoration mechanism. These techniques passively carry out 1:1 duplex transmission for all of transmission routes or allocate spare wavelengths and routes in preparation for disconnection of transmission links, or execute these functions for each link to restore a network having a fault within a minimum period of time.

However, the aforementioned techniques which have been applied to conventional line switching networks are not suitable for OBS networks. For example, the conventional techniques cannot guarantee transmission reliability when protection and restoration are made in the OBS networks in spite of low network efficiency and complicate the structure of OBS networks. Furthermore, it is impossible to operate networks based on various new policies when QoS-based transmission is performed. This is because the OBS networks have both of packet switching and circuit switching characteristics and use one-way signaling such that a transmission channel is reserved and then data bursts are transmitted through the reserved channel.

SUMMARY OF THE INVENTION

Accordingly, the present invention is directed to a method for protecting and restoring a link in an OBS network that substantially obviate one or more problems due to limitations and disadvantages of the related art.

An object of the present invention is to provide a method for protecting and restoring a link in an OBS network.

Another object of the present invention is to provide a method for protecting and restoring a link, which improves low network efficiency of a passive protecting and restoring mechanism by using a dynamic multiplexing technique.

Still another object of the present invention is to provide a method for protecting an restoring a link, which calculates the number of restoration wavelengths, which is proportional to a load between nodes, in real time and allows the nodes to share the information on the number of wavelengths, thereby to guarantee the reliability of protecting and restoring process and improve wavelength utilization efficiency.

Yet another object of the present invention is to provide a method for protecting and restoring a link, which solves a transmission wavelength mixing problem caused by statistical multiplexing using a control packet of OBS.

A further object of the present invention is to provide a method for protecting and restoring a link, which is the most realizable based on the transmission node structure of OBS network and detailed techniques.

A still further object of the present invention is to provide a method for protecting and restoring a link, which improves network efficiency through a dynamic resources-shared scheme that allocates multi-channel transmission links to transmission and protection/restoration channels in response to a network load and actively carries out protection and restoration by channels and traffic classes based on a QoS policy.

Still another object of the present invention is to provide a method for protecting and restoring a link, which merges optical label information and discriminates merged wavelengths through information exchange to restore a link having a problem.

Yet another object of the present invention is to provide a method for protecting and restoring a link, which can carry out protection and restoration for high channel efficiency and QoS on the basis of the current OBS technique.

A further object of the present invention is to provide a method for protecting and restoring a link, which makes the best use of a control packet in a control channel group, which enables a multi-wavelength OBS technique, to execute protection and restoration with high reliability and high speed while maintaining the existing transmission system.

Another further object of the present invention is to provide a method for protecting and restoring a link using a dynamic resource sharing and allocating algorithm that maximizes network transmission efficiency and performs QoS policy-based protection and restoration through packet switching.

To accomplish the above object, according to the present invention, there is provided a method for protecting and restoring a link, comprising the steps of transmitting/receiving a liveness-confirming message for confirming the liveness of the link between an up-node and a down-node respectively connected to both ends of the link at a predetermined message transmission period, to judge whether a fault is generated on the link; allowing the up-node and down-node to update link information, respectively when it is judged that the link fault is not generated; and restoring the link having the fault using predetermined restoration channel information based on an offered load measured when the link is in a normal state when it is judged that the link fault is generated.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 5a through 5e show formats of messages required for protecting and restoring a link according to an embodiment of the present invention;

FIGS. 6a and 6b are diagrams for explaining a dynamic channel allocation method for protecting and restoring a link according to an embodiment of the present invention; and FIG. 7 is a diagram for explaining an example of using a protection/restoration wavelength according to an embodiment of the present invention.

DETAILED DESCRIPTION OF THE PREFERRED EMBODIMENT

Reference will now be made in detail to the preferred embodiments of the present invention, examples of which are illustrated in the accompanying drawings.

Figure 1:
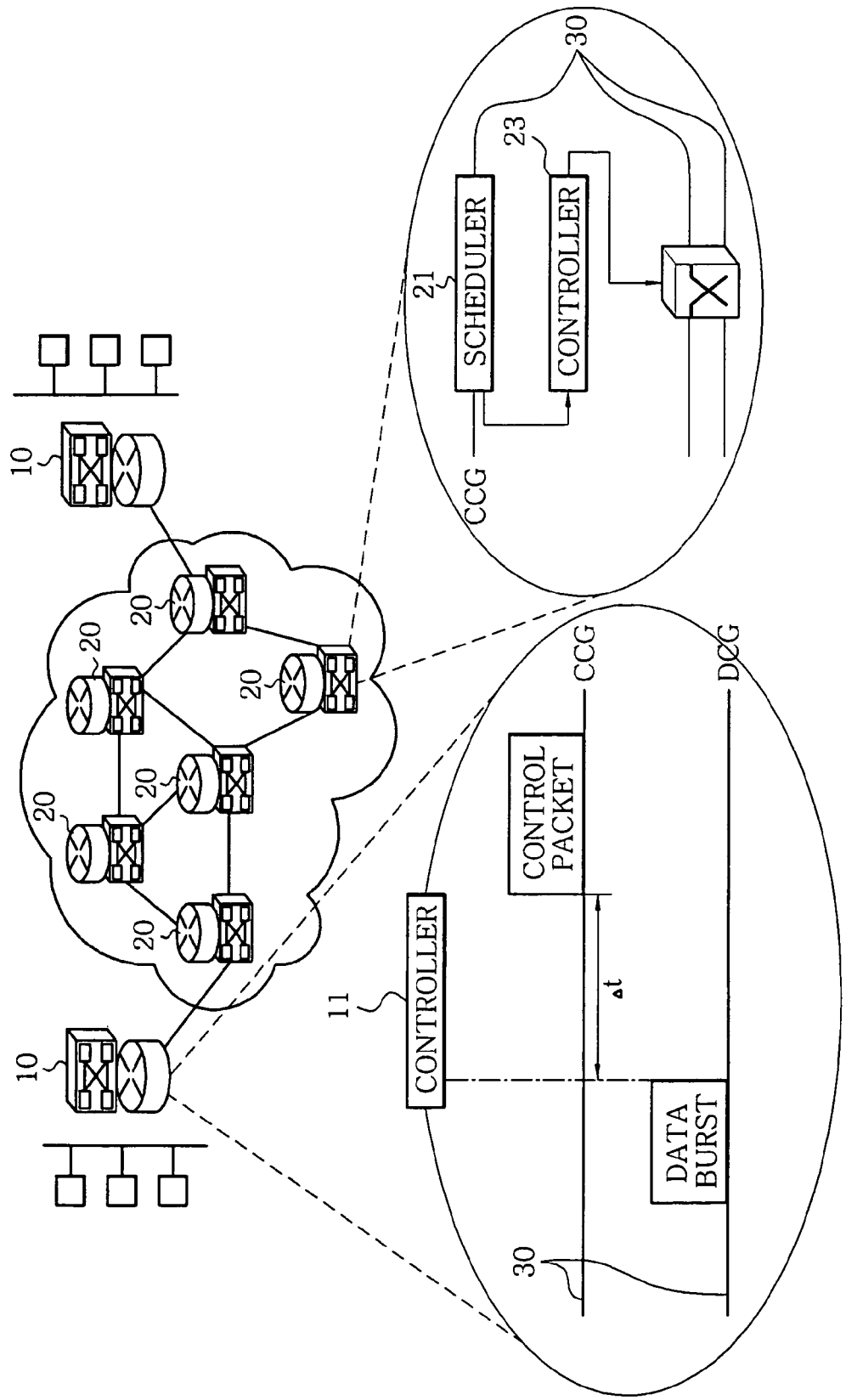
FIG. 1 shows the composition of an OBS network to which the present invention is applied.

FIG. 1 shows the composition of an OBS network to which the present invention is applied. Particularly, FIG. 1 illustrates channel reservation and burst transmission in a DWDM-based OBS transmission network. Referring to FIG. 1, the OBS transmission network includes edge routers 10, core routers 20 and a transmission link (for instance, a DWDM multiplexing links) 30.

The transmission link 30 is divided into a control channel group CCG for channel reservation and a data channel group DCG for optical burst transmission. The edge routers 10 assemble data to be transferred and correspond to terminating nodes of an optical transmission system. The core routers 20 are intermediate nodes connected between the edge routers 10.

Each edge router 10 generates a burst based on a burst destination and calculates the total number of nodes and a physical distance that the burst should pass to arrive at a destination node and an offset time $\Delta t$ in proportion to switching and packet processing time of intermediate nodes. In addition, the edge router 10 writes this switching information and burst length information in a control packet and transmits the control packet through the control channel group CCG. Furthermore, the edge router 10 transmits the data burst through the data channel group DCG after the lapse of the offset time $\Delta t$. The operation of the edge router 10 is carried out under the control of a controller 11 included in the edge router 10.

Each of the core routers 20 photoelectric-converts the control packet received from the control channel group CCG to interpret the information of the control packet under the control of a controller 21 included therein. A scheduler 23 included in the core router 20 makes a reservation of switching schedule based on the offset time $\Delta t$ written in the control packet. A switch switches a corresponding input port wavelength to an output port wavelength during a predetermined period of time, that is, a period of time corresponding to the burst length, based on the switching information written in the control packet. Here, the data burst is optically transmitted to its destination without being subjected to photoelectric conversion.

As described above, the OBS network establishes a route by a source-routing method according to one-way channel reservation signaling and thus there is high probability of losing a large quantity of data bursts even with a local network fault. Accordingly, the OBS network strongly requires an efficient protecting and restoring mechanism.

Figure 2:
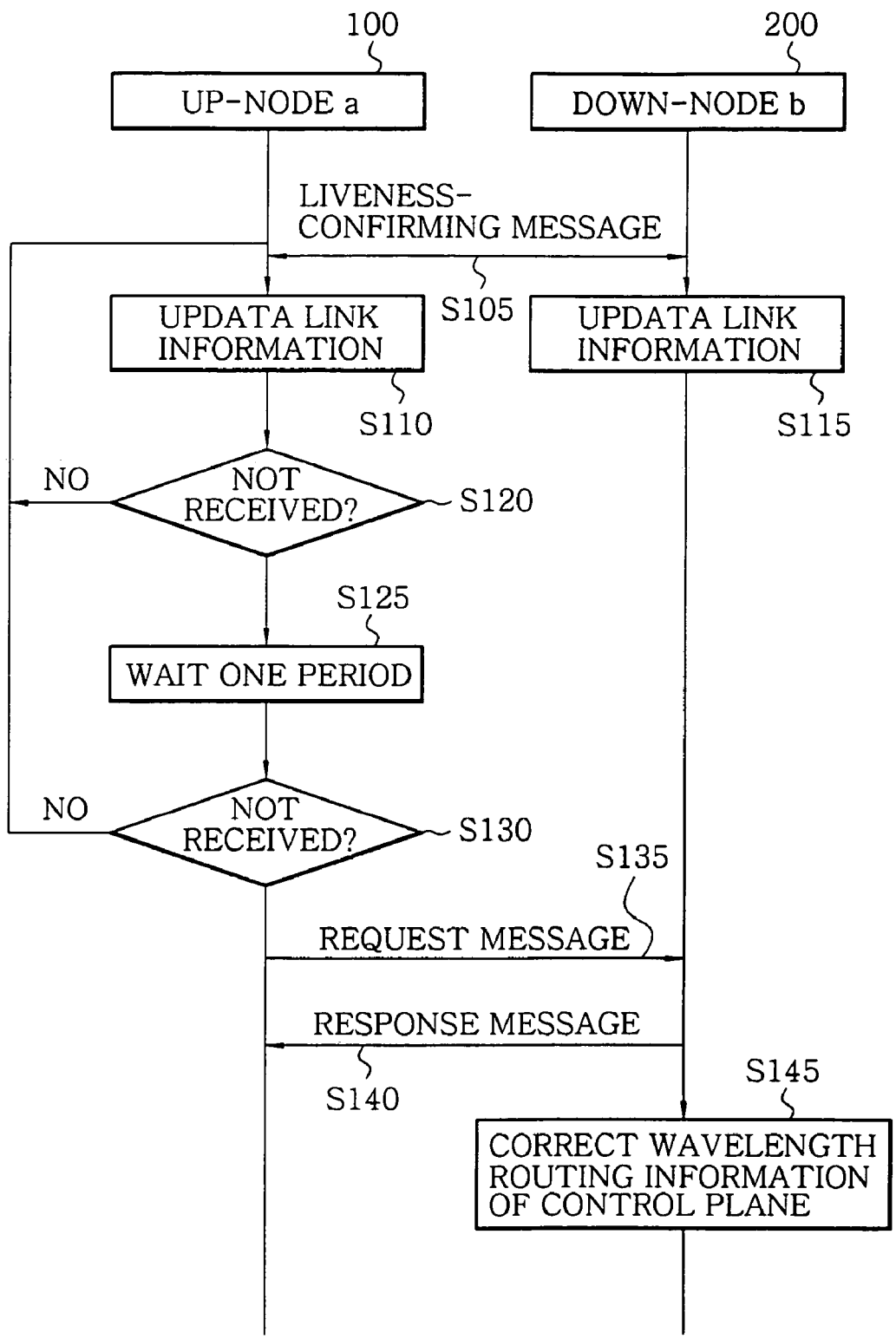
FIG. 2 is a flow chart showing a method for protecting and restoring a link according to an embodiment of the present invention.

FIG. 2 is a flow chart showing a method for protecting and restoring a link according to an embodiment of the present invention. Particularly, FIG. 2 shows a process of dynamically protecting and restoring a link when a fault on the link connected between an up-node 100 and a down-node 200 is detected.

The protecting and restoring method detects a fault in a network within a short period of time for the purpose of minimizing data loss due to the fault in the network. To this end, the method includes a fault detecting process S105 through S130, a process of starting restoration and transmitting restoration information S135, a process of confirming the restoration information and completing restoration S140 and S145.

1. Fault Detecting Process

A link fault due to cutting of an optical fiber is the cause of most optical network faults. To recognize the loss of optical signal due to the link fault rapidly and correctly, the fault detecting process confirms the liveness of the link by transmitting/receiving a link liveness-confirming message between neighboring nodes at a predetermined period T0 and updates link information. Specifically, the up-node 100 and down-node 200 transmit/receive the liveness-confirming message to/from each other at the specific period T0 to confirm the liveness of the link in the step S105. The up-node 100 and down-node 200 update link information, respectively, in the steps S110 and S115 when the link liveness is confirmed.

When the liveness-confirming message is not received during the period T0, a process of judging a link fault and restoring the link is started. At this time, it is preferable to wait one period T1 for more correct restoration. That is, it is judged that a link fault occurs when the liveness-confirming message is not received for two periods T0+T1 and the restoration process is started. In the example of FIG. 2, when the up-node 100 confirms that the liveness-confirming message is not received during the period T0 in the step S120, the up-node 100 waits for the liveness-confirming message for one more period T1 in the step S125. When the up-node 100 does not receive the liveness-confirming message even during the period T1 in the step S130, the up-node 100 judges that a link fault is generated. That is, the up-node 100 detects the link fault. While FIG. 2 shows an example that the up-node 100 detects the link fault, any node connected to the link can detect the link fault. In the example of FIG. 2, the down-node 200 also can detect the link fault.

2. Process of Starting Restoration and Transmitting Restoration Information

When the link fault is detected, as described above, the node that detects the link fault requests the restoration process to be started. When the up-node 100 detects the fault, as shown in FIG. 2, the up-node 100 transmits a request message to the down-node 200 through a control channel of a protection link in the step S135. The request message indicates the start of restoration process and, simultaneously, transmits information on a restoration wavelength. That is, the up-node 100 writes detailed information of the restoration wavelength, calculated in response to a network load of the up-node 100, in an information field of the request message and then transmits the request message to the down-node 200.

When the down-node 200 detects the link fault, the down-node 200 transmits a message requesting the up-node 100 to start the restoration process (for example, urge message for request) to the up-node 100. In this case, the up-node 100 carries out the step S135 in response to the message received from the down-node 200.

3. Process of Confirming Restoration Information and Completing Restoration

The down-node 200 that has received the request message transmits a response message to the up-node 100 in the step S140. Then, the down-node 200 corrects wavelength routing information of a control plane on the basis of the restoration information included in the request message.

Figure 3:
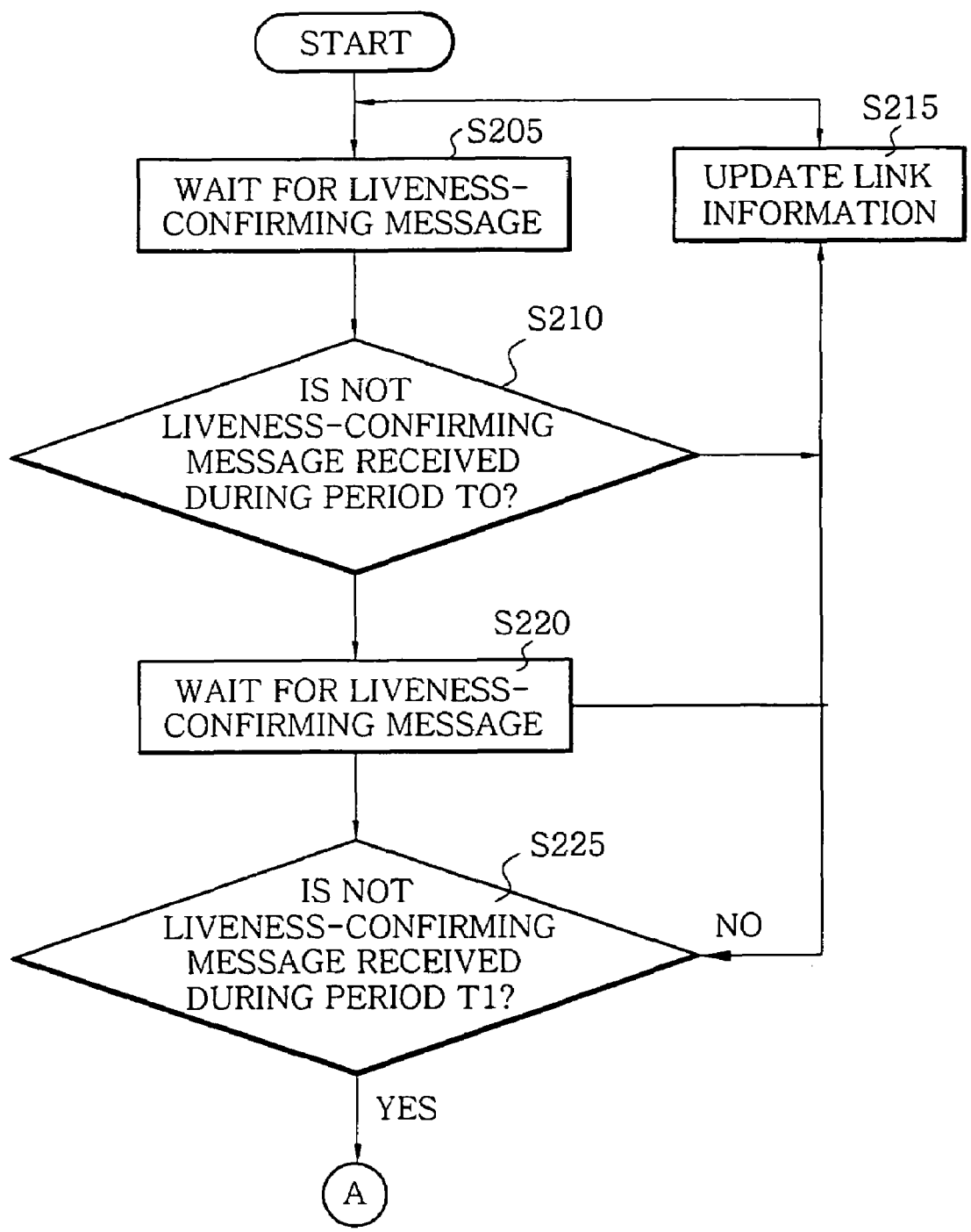
FIG. 3 is a flow chart showing a process at an up-node for protecting and restoring a link according to an embodiment of the present invention.
Figure 3:
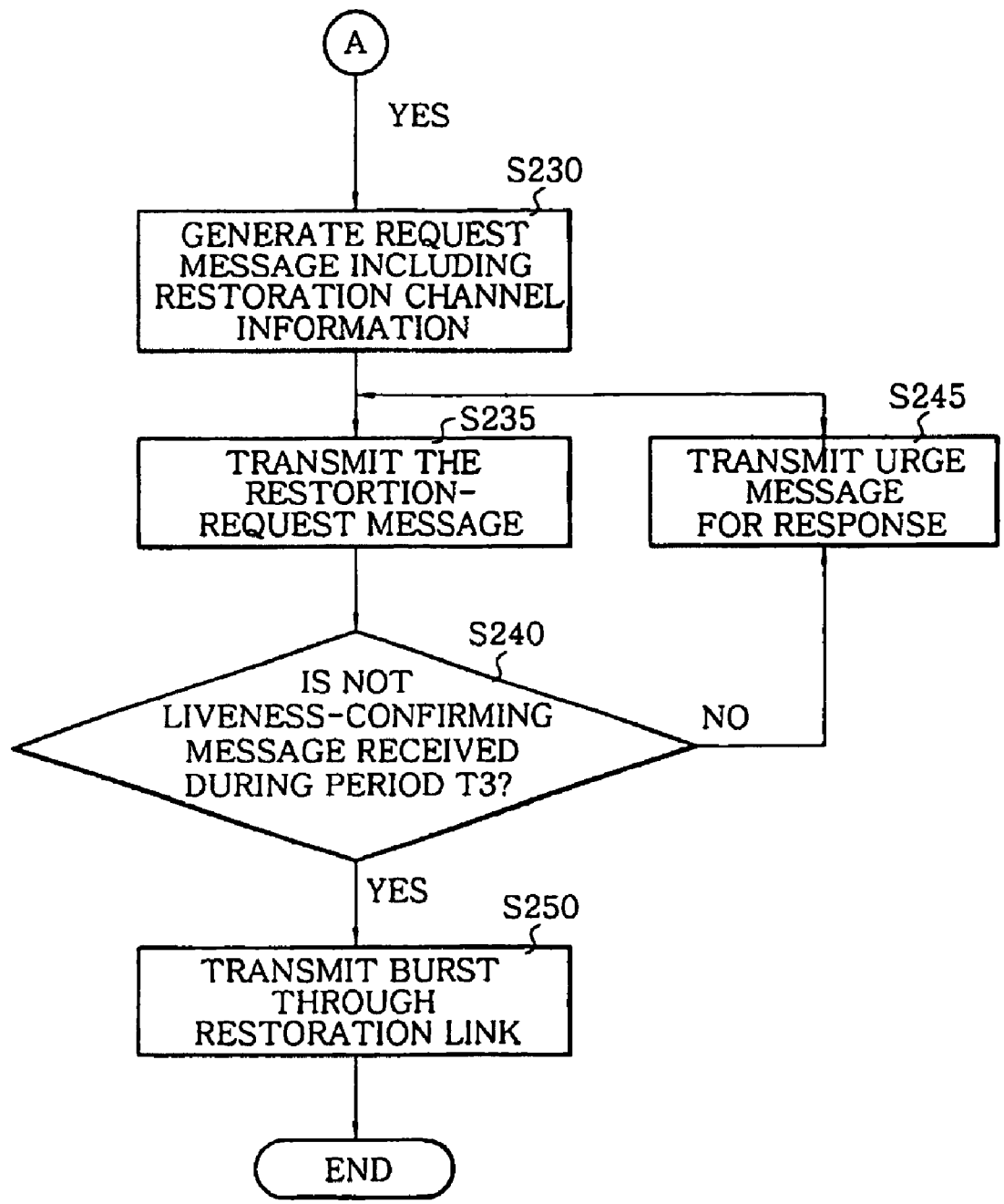
Figure 4:
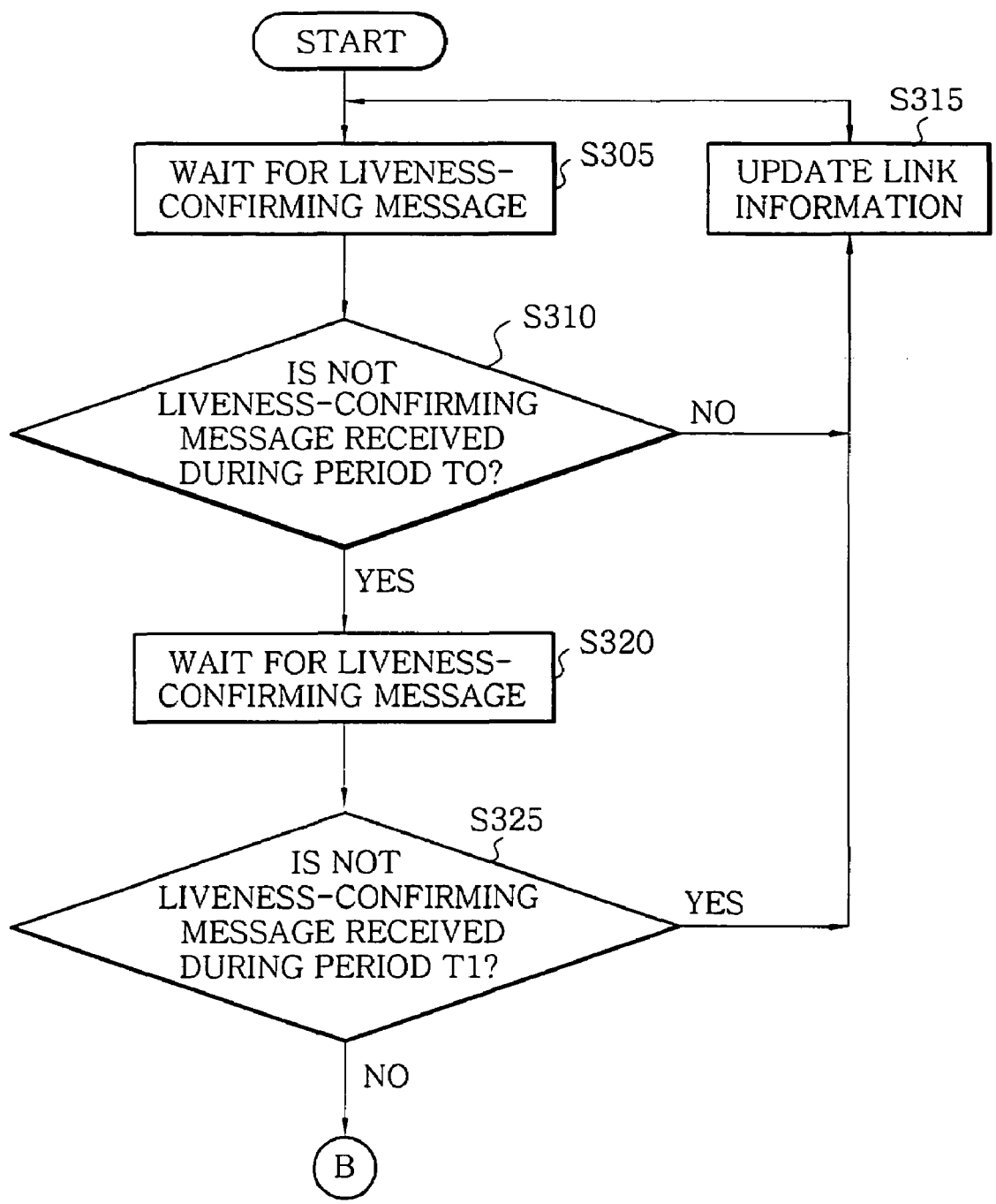
FIG. 4 is a flow chart showing a process at a down-node for protecting and restoring a link according to an embodiment of the present invention.
Figure 4:
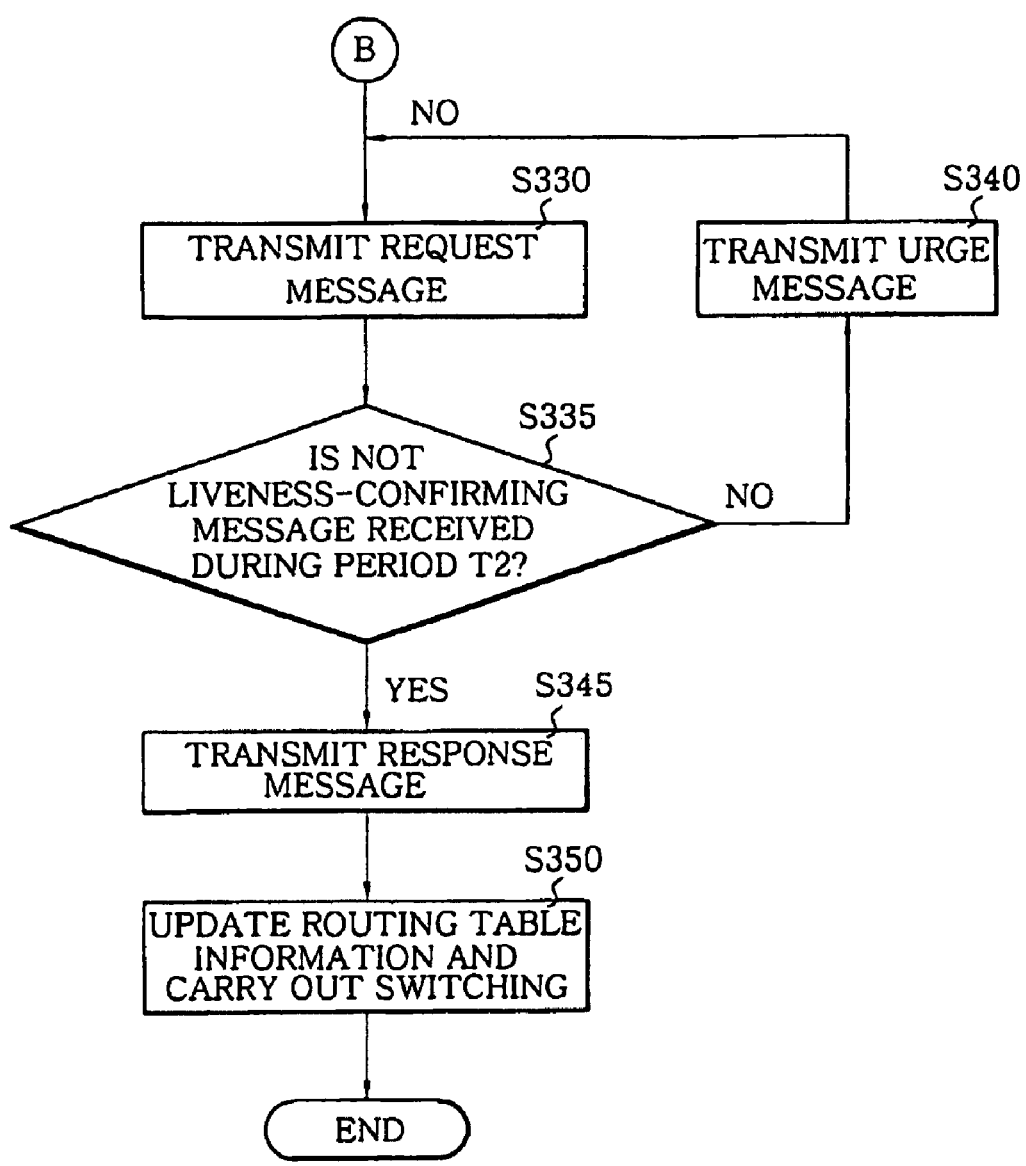

A method for protecting and restoring a link according to the present invention will now be explained in more detail with reference to FIGS. 3 and 4. FIG. 3 is a flow chart showing a process at the up-node for protecting and restoring a link according to an embodiment of the present invention, and FIG. 4 is a flow chart showing a process at the down-node for protecting and restoring a link according to an embodiment of the present invention.

Referring to FIG. 3, the up-node waits for the liveness message to be transmitted thereto from the down-node in the step S205. To this end, the liveness-confirming message for confirming the liveness of the link is transmitted/received between the up-node and down-node connected to each other through a normal link. That is, each node periodically transmits the liveness-confirming message in which the time point when the message is transmitted is written to a neighboring node and confirms whether the liveness-confirming message is periodically received from the neighboring node. In the step S205, the up-node that has transmitted the liveness-confirming message to the down-node waits for the liveness-confirming message to be transmitted thereto from the down-node.

When the up-node receives the liveness-confirming message during a predetermined first period T0 (that is, within the first period T0) in the step S210, the up-node updates link information using the liveness-confirming message in the step S215. Here, the up-node analyzes the liveness-confirming message, compares the liveness-confirming message transmission time with the time of period right before the corresponding period, and then updates a link information table thereof. When there is a large difference between transmission periods of two continuous messages, the up-node can predict a problem generated in the link state.

When the up-node does not receive the liveness-confirming message during the first period T0, the up-node waits for the liveness-confirming message to be transmitted thereto from the down-node for a second period T1 different from the first period T0 in the step S220. This is for the purpose of improving reliability of judgement of link fault. When the liveness-confirming message is received during the second period T1 in the step S225, the up-node updates the link information in the step S215. Here, the updating step S215 has been described above. When the liveness-confirming message is not received even during the second period T1 (that is, periods T0+T1), the up-node detects a fault on the corresponding link and stars the restoration process.

Specifically, the up-node generates the request message including restoration channel information, which is previously calculated by a load of each node and dynamically allocated, in the step S230 and transmits the request message to the down-node in the step S235. This step S235 transmits the request message to the down-node through the control channel group CCG of the protection link. Then, the up-node confirms whether the response message is received from the down-node during a third period T3 in the step S240. When the response message is not received during the third period T3, the up-node transmits the urge message for response, which requests the response message; to the down-node in the step S245. Then, the up-node transmits the request message once more.

When the restoration process is completed through the above-described steps, the up-node transmits following bursts through the restored link in the step S250.

The process at the down-node for protecting and restoring a link according to an embodiment of the present invention will now be explained with reference to FIG. 4. Referring to FIG. 4, steps S305 through S325 for detecting a link fault in the process for protecting and restoring a link are similar to the steps S205 through S225 of the process shown in FIG. 3. That is, both of the up-node and down-node can detect a link fault and the processes carried out by them are similar to each other. Accordingly, detailed explanation for the link fault detecting process at the down-node is omitted.

The down-node that has detected a link fault through the steps S305 through S325 waits for the request message transmitted from the up-node in the step S330. When the request message is not received from the up-node during a predetermined third period T2 in the step S335, the down-node transmits an urge message to the up-node to request the up-node to transmit the request message in the step S340.

While the link fault detecting process is carried out by transmitting the liveness-confirming message between the up-node and down-node such that the up-node and down-node simultaneously detect the initial link fault, the steps S330, S335 and S340 can be omitted when the up-node detects the link fault and transmits the request message.

The down-node that has received the request message from the up-node transmits the response message to the up-node in the step S345. Then, the down-node updates information of the routing table thereof based on transmission channel information of each burst to prevent the generation of wavelength mixing problem and then performs switching in the step S350.

As shown in FIGS. 3 and 4, the bidirectional protecting and restoring process carried out between the up-node and down-node restores the link having a local fault in the OBS network through the dynamically allocated protection wavelength. This prevents the loss of data in the network and enables stable protection and restoration within a short period of time.

FIGS. 5a through 5e show formats of messages required for protecting and restoring a link according to an embodiment of the present invention. FIG. 5a shows the format of the liveness-confirming message 510 transmitted between the up-node and down-node, and FIG. 5b shows the format of the request message 520 transmitted from the up-node to the down-node. FIG. 5c shows the format of the response message 530 transmitted from the down-node to the up-node, and FIG. 5d shows the format of a first urge message for request, transmitted from the down-node to the up-node. FIG. 5e shows the format of a second urge message for response 550, transmitted from the up-node to the down-node.

Referring to FIGS. 5a through 5e, the messages 510, 520, 530, 540 and 550 include destination node ID fields 511, 521, 531, 541 and 551, source node ID fields 512, 522, 532, 542 and 552, type fields 513, 523, 533, 543 and 553, TTL (time to live) fields 514, 524, 534, 544 and 554, and control information fields 515, 525, 535, 545 and 555, respectively. The destination node ID fields 511, 521, 531, 541 and 551 store the IDs of nodes to which the corresponding messages will be transmitted, and source node ID fields 512, 522, 532, 542 and 552 store the IDs of nodes generating the corresponding messages. For example, the request message 520 stores the ID of the down-node in the destination node ID field 521 and stores the ID of the up-node in the source node ID field 522.

The type fields 513, 523, 533, 543 and 553 store information for discriminating the uses of the messages. Thus, the type fields 513, 523, 533, 543 and 553 of the respective messages 510, 520, 530, 540 and 550 store different values. The TTL fields 514, 524, 534, 544 and 554 store information on the time for the respective corresponding messages to survive. It is preferable that the TTL fields store '1' in order to transmit the messages only between neighboring nodes to prevent an unnecessary increase in the network load.

The control information fields 515, 525, 535, 545 and 555 store control information suitable for characteristics of the respective messages. Specifically, the control information field 515 of the liveness-confirming message 510 stores transmission time of the liveness-confirming message at each node, and the control information field 525 of the request message 520 stores protection channel information previously appointed. The control information field 535 of the response message 530 stores ACK/NAK to response request message of the protection channel information, and the control information field 545 of the first urge message for request 540 stores information of urge retransmission of request message, which requests the up-node to urgently retransmit the request message. The control information field 555 of the second urge message for response 550 stores information of urge retransmission of response message, which requests the down-node to urgently retransmit the response message.

For more stable message transmission, it is possible to allocate separate designated channels among channels belonging to the control channel group CCG of the OBS network to discriminate a channel through which a general channel reservation control packet is transmitted from a channel through which the messages required for protection and restoration are transmitted. Furthermore, the periods T0, T1, T2 and T3 of the liveness-confirming message, request message and response message required for the judgement of restoration are decided on the basis of the form of the network and QoS policy that customers desire.

FIGS. 6a and 6b are diagrams for explaining a dynamic channel allocation method for protecting and restoring a link according to an embodiment of the present invention.

Nodes (up-node and down-node, for example) at both ends of a link, which take the responsibility of restoring a link having a problem, previously calculate the total number of required restoration wavelengths in response to an offered load introduced into the respective nodes in real time to efficiently protect and restore the link having a problem. Simultaneously, the nodes allow remaining channels in the protection link, which are not allocated as protection channels, to be actively used as transmission links. This technique is similar to the conventional 1:1 link-based protection and restoration mechanism from the fact that communication is carried out using the protection link when an operating link has a problem. However, the dynamic resources-shared OBS protection and restoration mechanism actively calculates the number of restoration wavelengths and prepares the restoration wavelengths in response to an input network load of each node. Thus, the dynamic resources-shared OBS protection and restoration mechanism can perform protection and restoration more resource-efficient than the 1:1 link-based protection and restoration mechanism that should prepares a specific restoration wavelength all the time irrespective of a load. Furthermore, the dynamic resources-shared OBS protection and restoration mechanism can protect QoS-based low priority traffic, which was not considered in the 1:1 link-based protection mechanism, using the remaining channels of the restoration link. This enables more stable communication.

Referring to FIG. 6a, the up-node 100 measures an offered load introduced thereto in the step S605 and periodically calculates the minimum number of restoration wavelengths required for restoring the network when the network has a problem in the step S610. Then, the up-node informs the down-node 200 of the calculated value in advance in the step S615 and updates corresponding information of the table thereof (for example, protection channel allocation table shown in FIG. 6b) in the step S620. The down-node 200 that has received the calculated value from the up-node 100 updates detailed information of the corresponding restoration wavelengths (for example, the number of restoration wavelengths) in the protection channel allocation table thereof. In this manner, a minimum confirmation procedure between the two nodes is executed when the network has a problem and then network restoration is made.

FIG. 6b shows an example of the protection channel allocation table. Referring to FIG. 6b, the protection channel allocation table stores and manages channel information required for protection and restoration in response to the load of the up-node. That is, restoration wavelengths required for restoration are $\lambda\_p1$ and $\lambda\_p2$ when the load is 0.4 and $\lambda\_p1$ and $\lambda\_p3$ when the load is 0.6.

Here, the number of restoration wavelengths, calculated in real time, is decreased when the load becomes small but increased when the load becomes large. If the offered load is very large, the operation of the proposed dynamic resource allocating method becomes identical to that of the conventional 1:1 link-based protection and restoration mechanism. However, the remaining wavelengths in the protection link, which are generated all the time according to dynamic resource allocation, are utilized for the transmission of burst traffic of low priority in normal times. Accordingly, the proposed method maximizes network transmission efficiency and enables policy-based transmission.

FIG. 7 is a diagram for explaining an example of using a protection/restoration wavelength according to an embodiment of the present invention. Specifically, FIG. 7 shows a process of merging a large number of data bursts in a transmission wavelength into a small number of protection wavelengths, which is carried out at the up-node, and a process of restoring the original transmission wavelength according to wavelength conversion at the down-node.

As described above, the correspondence relationship between information on the transmission wavelength of bursts and restoration wavelengths to be merged in the restoration process is recorded in the protection channel allocation table of the up-node and down-node according to exchange of restoration wavelength allocation information, which is periodically carried out between the nodes. This information is linked with the contents of the information field of the request message transmitted by the up-node at the initial step of the restoration process and updates information of the switching tables of the up-node and down-node to make a reservation of the following switching procedure. That is, when the restoration process is started, the up-node should inform the down-node of switching table information composed based on the information of OBS control packet, received up to now. All the switching time and wavelength information in the switching table are information items about bursts that are not processed by the up-node yet. Here, the up-node writes the types of individual transmission wavelengths to be merged into each restoration wavelength, switching time in response to a transmission burst length, and information about output transmission wavelengths to which the transmission wavelengths should be restored at the down-node in the information field of the request message and transmits the request message to the down-node through a wavelength in the control channel group of the restoration link.

The down-node that has received the request message compares the request message with the contents of the protection channel allocation table to confirm the type of the restoration wavelength. Simultaneously, the down-node updates unswitching information of the up-node into information of the switching table thereof to perform wavelength conversion switching to an appropriate output transmission wavelength for each protection wavelength that will be input. This is a process required for restoring bursts corresponding to control packets that have arrived at the up-node before the restoration process is started. Control packets arrived after the transmission of request message are transmitted to the control channel group of the restoration link in the same manner of a general OBS processing method such that the restoration link is completely exclusively used for the transmission link.

Referring to FIG. 7, the up-node merges bursts $T_0 \sim T_1$ [$\lambda\_\omega 3$], $T_1 \sim T_2$[$\lambda\_\omega 4$] and $T_2 \sim T_3$[$\lambda\_\omega 5$] of individual transmission wavelengths through time division multiplexing, and then transmits the merged burst with previously reserved restoration wavelengths $T_0 \sim T_3$[$\lambda\_p1$]. A switching controller 220 of the down-node 200 controls a switch 230 to wavelength-convert and switch an individual burst in the input restoration wavelength to an appropriate output transmission wavelength based on switching duration time information stored in the switching table 210. Then, the input information transmitted with the restoration wavelength $T_0 \sim T_3$[$\lambda\_p1$] is divided into the bursts $T_0 \sim T_1$[$\lambda\_\omega 3$], $T_1 \sim T_2$[$\lambda\_\omega 4$] and $T_2 \sim T_3$[$\lambda\_\omega 5$] according to the switch and outputted. Here, burst duration time of the output wavelength will be delayed by processing time required for wavelength conversion and information processing. However, the delay will be insignificant in consideration of a rapid processing speed of an optical network system. Accordingly, bursts introduced into the up-node of a link having a trouble can be retransmitted using the previously reserved transmission wavelength. This enables prevention of fault in the entire network due to a local network fault to avoid protection and restoration of complicated route-based network.

The OBS protection and restoration mechanism using real-time processing of optical wavelength information and dynamic resource sharing in response to a network load according to the present invention has the following advantages.

Firstly, the transmission efficiency of DWDM-based OBS network can be maximized. The OBS protecting and restoration mechanism of the present invention improves low network efficiency of the conventional line switching-based protection and restoration mechanism to make a reservation of only a restoration wavelength in proportion to a load and actively utilize the remaining wavelengths of the restoration link for burst transmission, thereby maximizing network transmission efficiency.

Secondly, QoS-based transmission and protection can be performed. A conventional QoS guaranteeing method attempts to guarantee QoS in a single link and thus it is difficult to guarantee QoS when a network load is increased. However, the dynamic resource sharing method can use the restoration link for transmission purpose in normal times so that a fundamental bandwidth is increased and independent link transmission is enabled by QoSs. Thus, various transmission policies can be attempted. Furthermore, a variety of restoration wavelength reservation algorithms can be applied to the restoration process based on burst priority information to realize discriminative restoration time and reliability in response to priority.

Thirdly, the liveness-confirming message is transmitted all the time to monitor a link in real time in the restoration process and, simultaneously, the number of the most appropriate restoration wavelengths and merging information are periodically updated, to enable efficient network restoration within a short period of time in the actual network restoration process. Moreover, this link-based protection and restoration can prevent a local network fault from causing data loss in the network and efficiency deterioration.

Fourthly, a large number of bursts are merged in a single restoration wavelength through time division multiplexing and the down-node is informed of information about the burst merging such that the down-node can carry out switching and wavelength conversion in response to switching time to transmit each data burst with the original wavelength. This can solve the wavelength mixing problem or merged optical label problem of the conventional optical network.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for protecting and restoring a link, comprising:
   transmitting/receiving a liveness-confirming message for confirming the liveness of the link between an up-node and a down-node respectively connected to both ends of the link at a predetermined message transmission period, to judge whether a fault is generated on the link;
   allowing the up-node and down-node to update link information, respectively when it is judged that the link fault is not generated; and
   restoring the link having the fault using predetermined restoration channel information based on an offered load measured when the link is in a normal state when it is judged that the link fault is generated;
   the up-node merging a large number of data bursts in a transmission wavelength into a small number of protection wavelengths using the restoration channel information and transmitting the protection wavelengths; and
   the down-node restoring the merged wavelengths to the transmission wavelength through wavelength conversion using the restoration channel information.

2. The method as claimed in claim 1, wherein it is judged that the link fault is generated when the liveness-confirming message is not received during the message transmission period.

3. The method as claimed in claim 2, wherein it is judged that the link fault is generated when the liveness-confirming message is not received while the message transmission period is repeated more than once.

4. The method as claimed in claim 2, wherein it is judged that the link fault is generated when the liveness-confirming message is not received while the message transmission period is repeated more than twice.

5. The method as claimed in claim 1, wherein restoring the link comprises:
   allowing the up-node to transmit a restoration-requesting message (request message) including the restoration channel information to the down-node;
   allowing the down-node to transmit a response message to the up-node; and
   allowing the down-node to update wavelength routing information using the restoration channel information.

6. The method as claimed in claim 5, wherein the request message includes a destination node identification field, a source node identification field, a type of field for deciding the type of message, a time field for storing information on the time during which the message lives, and a control information field for storing previously appointed restoration channel information.

7. The method as claimed in claim 5, wherein the response message includes a destination node identification field, a source node identification field, a type field for deciding the type of message, a time field for storing information on the time during which the message lives, and a control information field for storing ACK/NAK to response request message of the restoration channel information included in the request message.

8. The method as claimed in claim 5, wherein restoring the link further includes the down-node requesting the up-node to transmit the restoration-requesting message when the request message is not transmitted during a predetermined restoration waiting time.

9. The method as claimed in claim 8, wherein requesting the transmission of the request message comprises transmitting a message including a destination node identification field, a source node identification field, a type field for deciding the type of message, a time field for storing information on the time during which the message lives, and a control information field for storing information that requests the up-node to urgently transmit the request message.

10. The method as claimed in claim 5, wherein restoring the link further includes the up-node requesting the down-node to transmit the response message when the response message from the down-node is not received during a predetermined response waiting time.

11. The method as claimed in claim 10, wherein requesting the transmission of the response message comprises transmitting a message including a destination node identification field, a source node identification field, a type field for deciding the type of message, a time field for storing information on the time during which the message lives, and a control information field for storing information that requests the down-node to urgently transmit the response message.

12. The method as claimed in claim 1, wherein the liveness-confirming message includes a destination node identification field, a source node identification field, a type field for deciding the type of message, a time field for storing information on the time during which the message lives, and a control information field for storing message transmission time at each node.

* * * * *